(12) United States Patent
Narasimhan

(10) Patent No.: US 7,577,085 B1
(45) Date of Patent: Aug. 18, 2009

(54) MULTICARRIER TRANSMIT DIVERSITY

(75) Inventor: Ravi Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 982 days.

(21) Appl. No.: 10/189,385

(22) Filed: Jul. 5, 2002

Related U.S. Application Data

(63) Continuation of application No. 10/162,274, filed on Jun. 3, 2002, now abandoned.

(51) Int. Cl.
| | | |
|---|---|---|
| *H04J 11/00* | (2006.01) | |
| *H04B 7/216* | (2006.01) | |
| *H04B 7/02* | (2006.01) | |
| *H04B 15/00* | (2006.01) | |
| *H04K 1/10* | (2006.01) | |
| *H04B 7/10* | (2006.01) | |

(52) U.S. Cl. .................. 370/206; 370/335; 370/342; 375/260; 375/267; 375/285; 375/299; 375/347

(58) Field of Classification Search ......... 370/203–210, 370/335, 342; 375/260, 267, 285, 299, 347
See application file for complete search history.

(56) References Cited

U.S. PATENT DOCUMENTS

| | | | | |
|---|---|---|---|---|
| 5,598,419 | A | | 1/1997 | Weigand et al. ............. 370/514 |
| 5,668,813 | A | | 9/1997 | Malek et al. ................ 370/514 |
| 5,729,543 | A | | 3/1998 | Weigand et al. ............. 370/347 |
| 5,745,484 | A | | 4/1998 | Scott .......................... 370/347 |
| 5,822,308 | A | | 10/1998 | Weigand et al. ............. 370/280 |
| 6,031,833 | A | | 2/2000 | Fickes et al. ................ 370/349 |
| 6,122,267 | A | | 9/2000 | Abiven et al. ............... 370/338 |
| 6,144,711 | A | * | 11/2000 | Raleigh et al. .............. 375/347 |
| 6,185,258 | B1 | * | 2/2001 | Alamouti et al. ............ 375/260 |
| 6,351,499 | B1 | * | 2/2002 | Paulraj et al. ............... 375/267 |
| 6,424,679 | B1 | * | 7/2002 | Dabak et al. ................ 375/267 |
| 6,442,214 | B1 | * | 8/2002 | Boleskei et al. ............ 375/299 |
| 6,501,803 | B1 | * | 12/2002 | Alamouti et al. ............ 375/265 |
| 6,731,668 | B2 | * | 5/2004 | Ketchum ..................... 370/209 |
| 7,002,900 | B2 | * | 2/2006 | Walton et al. ............... 370/208 |

(Continued)

OTHER PUBLICATIONS

Lee, King, A space frequency transmitter diversity technique for OFDM systems, Dec. 1, 2000, IEEE, pp. 1473-1477.*

(Continued)

*Primary Examiner*—Steven H Nguyen

(57) ABSTRACT

Method, apparatus, and data packet format to implement transmit diversity in a multicarrier environment is disclosed. For diversity transmission operations, space frequency encoding techniques are employed creating distinguishable first and second time domain signals from a multicarrier frequency domain symbol bearing data of interest, which are then broadcast in parallel over first and second transmission units respectively. For diversity reception operations, complementary space frequency decoding is used to recover a corrected multicarrier frequency domain symbol from a time domain signal containing either this symbol, a space frequency modified symbol based on the multicarrier symbol, or a possible partial/complete combination of both. The data packet format includes portions defining a transmission diversity semaphore, a preamble enabling training of a receiver receiving the data packet, and a payload. This payload includes plural data symbol pairs, each defining a first symbol for transmission by a first transmission unit of a diversity transmitter, and a second symbol for transmission by a second transmission unit of the diversity transmitter, the second symbol being derived from the first symbol.

62 Claims, 6 Drawing Sheets

U.S. PATENT DOCUMENTS

| | | | | |
|---|---|---|---|---|
| 7,020,072 | B1* | 3/2006 | Li et al. | 370/208 |
| 7,065,036 | B1* | 6/2006 | Ryan | 370/208 |
| 7,088,785 | B2* | 8/2006 | Nafie et al. | 375/267 |
| 7,149,253 | B2* | 12/2006 | Hosur | 375/267 |
| 2002/0131516 | A1* | 9/2002 | El-Gamal et al. | 375/285 |
| 2003/0072258 | A1* | 4/2003 | Tarokh et al. | 370/210 |

OTHER PUBLICATIONS

Peichocki R. Performance of space time coding with hiperlan/2 and IEEE 802.11a wlan standards on real channels, Oct. 11, 2001; pp. 848-852.*

Peichocki R. Performance of space frequency techniques over measured channels in MIMO-Systems, Oct. 11, 2001; pp. 1-9.*

IEEE P802.11/g/D8.2, Apr. 2003 (Supplement to ANSI/IEEE std 802.11 1999(Reaff 2003), *Sponsory LAN MAN Standards Committee of IEEE Computer Society*, "Part 11: Wireless LAN Medium Access Control (MAC) and Physical Layer (PHY) specifications: Further Higher Data Rate Extension in the 2.4 GHz Band," pp. 1-69.

Alamouti, Siavash M., "A Simple Transmit Diversity Technique for Wireless Communications", *IEEE Journal on Select Areas in Communications*, vol. 6, No. 8, Oct. 1998, pp. 1451-1457.

IEEE std. 802.11a—1999, *Sponsor LAN MAN Standards Committee of IEEE Computer Society*, "Part 11: Wireless LAN Medium Access Control (MAC) and Physical Layer (PHY) Specifications, High-Speed Physical Later Extension in the 5 GHz Band," Sep. 1999, pp. 1-83.

IEEE std. 802.11b—1999, *Sponsor LAN MAN Standards Committee of IEEE Computer Society*, "Part 11: Wireless LAN Medium Access Control (MAC) and Physical Layer (PHY) Specifications, Higher-Speed Physical Layer Extension in 2.4 GHz Band," Sep. 1999, pp. 1-89.

International Standard, ANSI/IEEE std. 802.11, first edition, *Sponsor LAN MAN Standards Committee of IEEE Computer Society*, "Part 11: Wireless LAN Medium Access Control (MAC) and Physical Layer (PHY) specifications," 1999.

* cited by examiner

MULTICARRIER TRANSMIT DIVERSITY

RELATED APPLICATION

This application is a continuation of copending U.S. patent application Ser. No. 10/162,274, filed Jun. 3, 2002, which is incorporated herein fully by reference.

TECHNICAL FIELD

This application is directed generally to wireless communications, and is specifically concerned with techniques for implementing transmit diversity in a multi-carrier environment.

BACKGROUND

The past few years has witnessed the ever-increasing availability of relatively cheap, low, power wireless data communication services, networks and devices, promising near wire speed transmission and reliability. One technology in particular, described in the IEEE Standard 802.11a (1999) and IEEE Draft Standard 802.11g (2002) Supplements to the ANSI/IEEE Standard 802.11, 1999 edition, collectively incorporated herein fully by reference and collectively referenced as "IEEE 802.11a & 802.11g", has recently been commercialized with the promise of 54 Mbps+ peak data rates, making it a strong competitor to traditional wired Ethernet and the more ubiquitous "802.11b" or "WiFi" 11 Mbps wireless transmission standard.

IEEE 802.11a & 802.11g compliant transmission systems achieve their high data transmission rates using a type of multicarrier frequency domain symbol encoding or modulation known as Orthogonal Frequency Division Multiplexing, ("OFDM"). In particular, OFDM encoded symbols mapped up to 64 QAM multicarrier constellation bear the data intended for transmission, though even larger constellations are contemplated to further increase data throughput. Before final power amplification and transmission, these OFDM encoded symbols are converted into the time domain using Inverse Fast Fourier Transform techniques resulting in a relatively high-speed time domain signal with a large peak-to-average ratio (PAR).

One concern with the IEEE 802.11a & 802.11g standards is the rather strict power levels compliant transmission equipment must operate within without running afoul of FCC and international intraband and interband interference limits, particularly at lower channels within the 5 GHz band for North American operation. Accordingly, standards compliant transmission equipment designers continue to seek ways to improve reception performance without needing to increase power output of the transmitter. One cost effective technique that has surprisingly not been explored in IEEE 802.11a/802.11g, is the concept of transmit diversity used in single carrier systems. See e.g., S. M. Alamouti, "A Simple Transmit Diversity Technique For Wireless Communications," IEEE Journal on Select Areas in Communications, vol. 16, no. 8, October 1998, pp. 1451-1458 which is incorporated herein fully by reference. Transmit diversity provides a diversity gain without multiple receiver chains as well as reduced power output from each transmitter since, for a constant total radiated power, the transmitted signals of interest are broadcast over two separately positioned antennas using two different RF transmission pathways at ½ power. This 3-dB reduction for each transmitting amplifier permits use of less expensive and less linear power amplifiers yet retain if not improve overall reception performance. However, in order to properly account for multipath distortion and other artifacts introduced by having dual proximate RF transmitters operating at the same carrier frequency, the receiver must know in advance that it will be operating in a diversity environment and accommodate for these effects.

The present high speed data wireless transmission standards in the 802.11 family, including the commercially important IEEE 802.11a & 802.11g standards do not account for transmit diversity. Therefore, it would be advantageous to incorporate transmit diversity in a wireless transmission system that is backwards compatible with the IEEE 802.11a & 802.11g standards, as well as provide for a wireless diversity system capable of operating in multicarrier encoding environments generally.

SUMMARY OF THE INVENTION

To address these perceived and related shortcomings, the present invention is directed to a method, apparatus, and data packet suitable for implementing transmit diversity in a multicarrier environment. In diversity transmission consistent with the present invention, space frequency encoding techniques are employed to create distinguishable first and second time domain signals from a multicarrier frequency domain symbol bearing the data of interest, which are broadcast in parallel over first and second transmission units respectively. In diversity reception consistent with the present invention, complementary space frequency decoding is used to recover a corrected multicarrier frequency domain symbol from a time domain signal containing either this multicarrier frequency domain symbol, a space-frequency modified symbol based on this multicarrier frequency domain symbol, or a possible incomplete or complete combination of both.

Accordingly, diversity transmission in accordance with an embodiment of the invention employs space frequency encoding operable on multicarrier frequency domain symbols which bear the data of interest to provide corresponding modified symbols. These multicarrier frequency domain symbols and their corresponding modified symbols are converted into corresponding time domain counterparts and then transmitted in parallel by first and second RF transmission units. These time domain counterparts may be transmitted at approximately the same time on the same frequency channel, or, alternatively, in a staggered sequence or on dissimilar channels as will be appreciated by those ordinarily skilled in the art.

Diversity aware reception in accordance with an embodiment of the invention includes utilizing a receiver to receive a time domain signal which may define both a multicarrier frequency domain symbol and a modified symbol based on such multicarrier frequency domain symbol. A conversion unit is employed to generate a composite signal in the frequency domain based on this time domain signal which includes at least an incomplete analog sum of the multicarrier frequency domain symbol and the modified symbol. Thereafter, a space frequency decoder is used to recover a corrected multicarrier frequency domain symbol from this composite signal.

A data packet according to an embodiment of the invention includes a first portion defining a transmission diversity semaphore, a second portion adjacent to the first portion and including a preamble to enable training of a receiver receiving the data packet, and a third portion following the second portion defining a payload. Here the payload includes a plurality of data symbol pairs with at least one of the data symbol pairs defining a first symbol capable of being transmitted by a first transmission unit of a diversity transmitter, and a second symbol capable of being transmitted by a second transmission unit of the diversity transmitter, wherein the second symbol is derived from the first symbol.

In accordance with these embodiments, a given multicarrier frequency domain symbol or first symbol may conveniently include an OFDM encoded symbol encoded in compliance with at least one of the IEEE Standard 802.11a and IEEE Standard 802.11g Supplements to the IEEE Standard 802.11 (1999) for wireless communications. The corresponding modified symbol or second symbol may conveniently include a re-ordered subcarrier complex conjugate of the given multicarrier frequency domain symbol to enable relatively fast and predictable space frequency encoding and decoding activities.

Additional aspects and advantages of this invention will be apparent from the following detailed description of embodiments thereof, which proceeds with reference to the accompanying drawings.

DETAILED DESCRIPTION OF THE EMBODIMENTS

Figure 1:
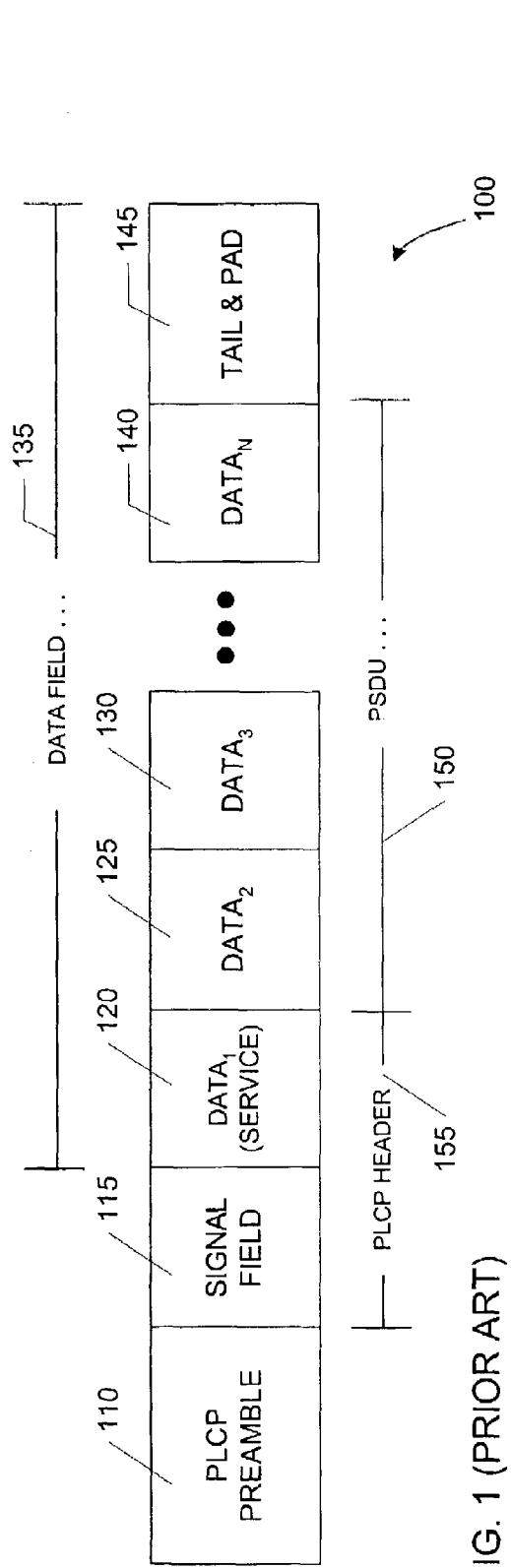
FIG. 1 is a known PLCP frame format compliant with IEEE 802.11a & 802.11g standards.

In order to better understand transmit diversity according to the present invention, discussion of the Physical Layer Control Protocol ("PLCP") frame format used to convey data in packet form (i.e. a type of data packet) in a IEEE 802.11a and/or 802.11g environment is deemed appropriate. FIG. 1. illustrates the general organization or format of a PLCP frame according to the IEEE 802.11a & 802.11g standards. The PLCP preamble 110 includes 10 short training symbols in order for an incident receiver to self-adjust the gain of the received baseband signal so that the received signal's amplitude is within the optimal range for analog-to-digital conversion, recover OFDM symbol timing and initiate coarse carrier signal frequency acquisition as is well known in the art. PLCP preamble 110 also includes two long training symbols following the 10 short training symbols which again allows the receiver to estimate the carrier channel being used, as well as any needed fine frequency acquisition. In essence, the receiver uses these long symbols for fine tuning of the training occurring during the previous 10 short symbols. With this preamble, it takes approximately 16 microseconds to train the receiver after first receiving the frame.

Still referring to FIG. 1, following the PLCP preamble 110 is the Signal field 115, which encodes the data rate of the data field 135 portion of the frame, followed by a Reserved bit set to zero under the existing IEEE 802.11a & 802.11g standards, a 12-bit Link field which identifies the number of octets in the frame, a parity bit to ensure that the first 17 bits of the frame Signal field (Rate, Reserved, and Link fields) have even parity and a 6-bit tail which is set to all zeroes. The Signal field 115 forms a first portion of the PLCP header 155 of the frame 100. As will be discussed in more detail below, for backwards compatibility purposes in accordance with the embodiment of the invention shown in FIG. 2, the Signal field 215 of data packet format 200 differs from the Signal field 115 in that the Reserved bit will contain a transmit diversity semaphore indicating to a transmit diversity aware receiver consistent with the present invention (herein "TX diversity receiver") such as receiver 400 discussed below whether or not transmit diversity has been enabled. The Signal field 115 is convolutionally encoded at 6 megabits per second using Binary Phase-Shift Keying (BPSK) no matter what the data rate the Signal field indicates.

A first portion of the data field 135 immediately follows the Signal field 115. This data field referred to in the figure as DATA$_1$ 120. More commonly known as the Service field, this field consists of 16 bits, with the first seven bits as zeros to synchronize the descrambler in the IEEE 802.11a & 802.11g compliant receiver and the remaining nine bits reserved for future use and set to zero. Together with the Signal field 115, the DATA$_1$/Service field 120 form the PLCP header 155.

DATA$_2$ 125, DATA$_3$ 130 . . . DATA$_N$ 140 represent the payload or PSDU ("PLCP Service Data Unit") 150 portion of the PLCP frame. It should be noted that DATA$_2$ 125, DATA$_3$ 130 . . . DATA$_N$ 140 each comprise an OFDM symbol transmitted using BPSK and QAM depending on the chosen data rate as presented in the following table:

| Data Rate (Mbps) | Modulation | Coding Rate | Coded Bits per Subcarrier | Code Bits per OFDM Symbol | Data Bits per OFDM Symbol |
|---|---|---|---|---|---|
| 6 | BPSK | ½ | 1 | 48 | 24 |
| 9 | BPSK | ¾ | 1 | 48 | 36 |
| 12 | QPSK | ½ | 2 | 96 | 48 |
| 18 | QPSK | ¾ | 2 | 96 | 72 |
| 24 | 16-QAM | ½ | 4 | 192 | 96 |
| 36 | 16-QAM | ¾ | 4 | 192 | 144 |
| 48 | 64-QAM | ⅔ | 6 | 288 | 192 |
| 54 | 64-QAM | ¾ | 6 | 288 | 216 |

During actual transmission a data scrambler using 127-bit sequence generator scrambles all the bits in the data field 135 to randomize the bit patterns in order to avoid long streams of ones and zeros.

Immediately following the payload or PSDU 150 is a tail and pad portion 145 of the PLCP frame. The tail field includes a bit string of 6 "zero" bits to return the convolutional encoder to a "zero" state. (The 6 scrambled "zero" bits in the tail field are replaced by 6 nonscrambled "zero" bits.) Subsequently, a variable length pad field is appended in order to extend the resulting bit string so that the resulting length will correspond to an integer number of OFDM symbols for transmission at the established data rate.

Figure 2:
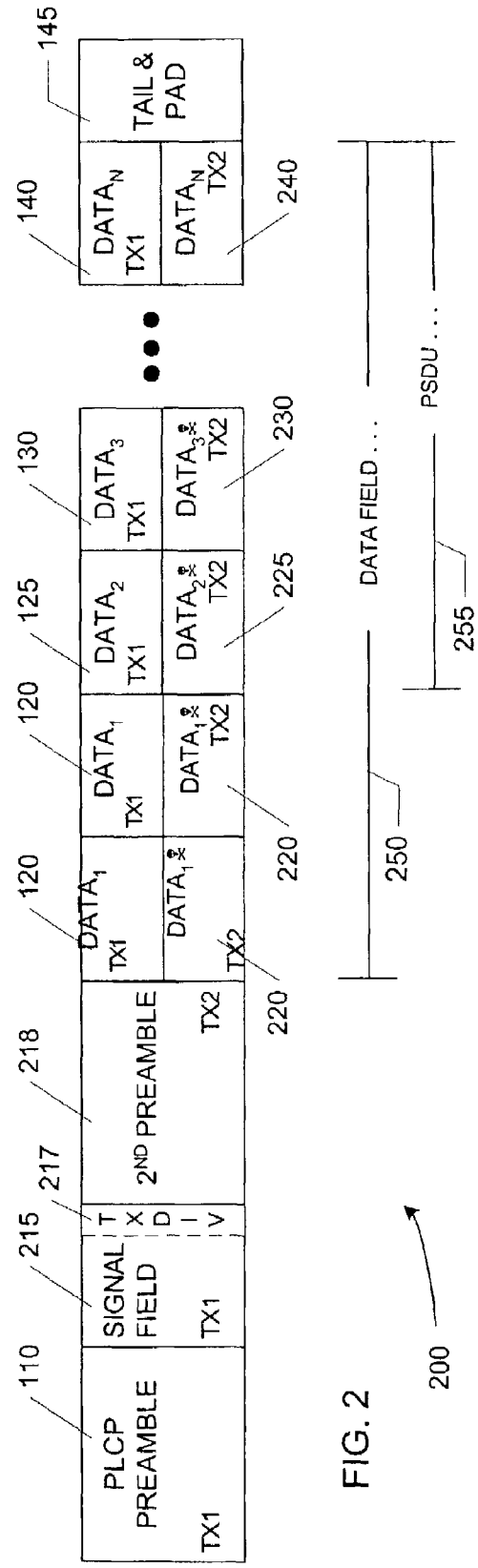
FIG. 2 is a data packet format according to an embodiment of the invention.
Figure 3:
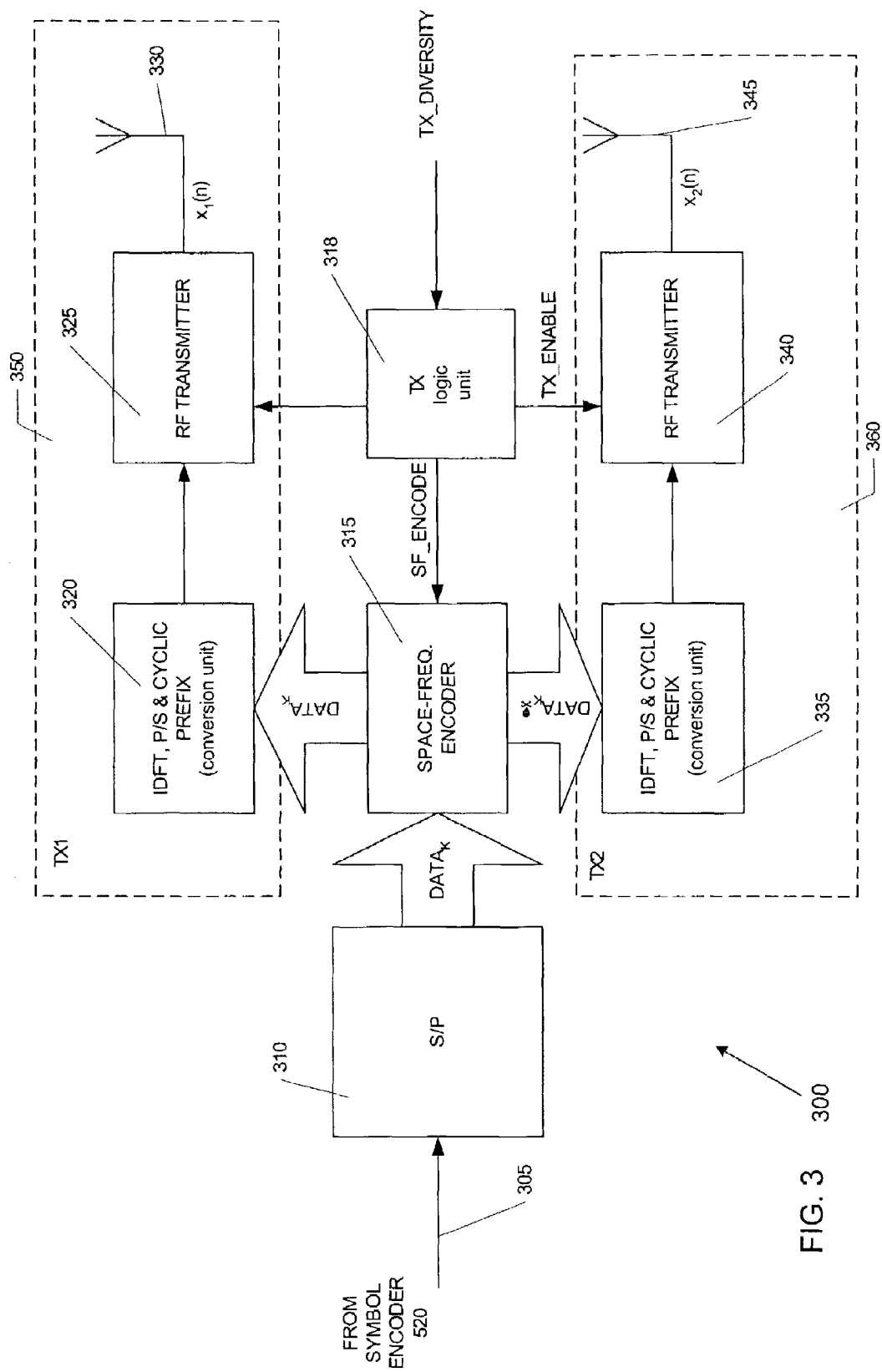
FIG. 3 is a simplified block diagram of a transmitter capable of transmitting a data packet formatted in accordance with FIG. 2.
Figure 6:
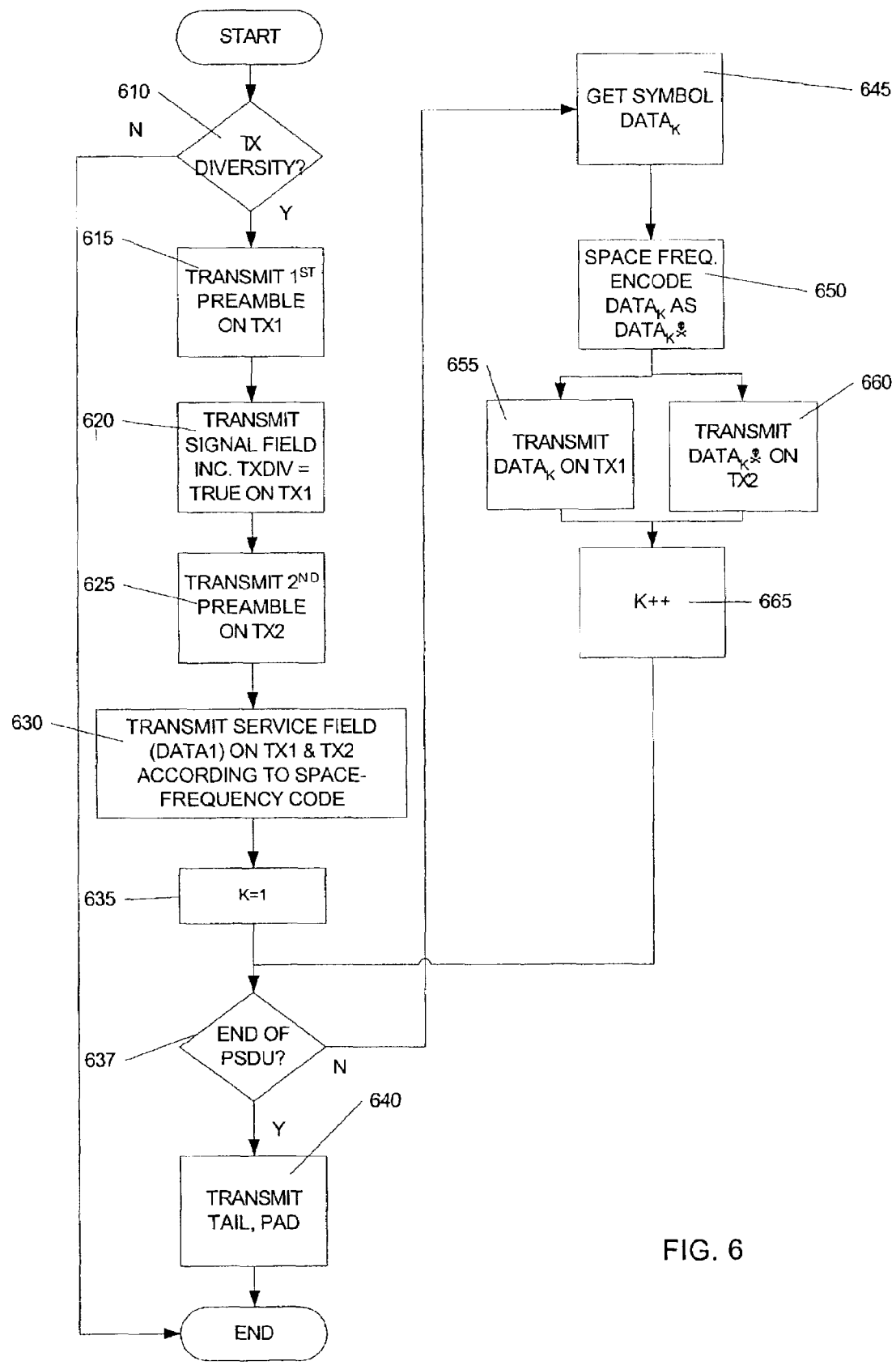
FIG. 6 is a flowchart illustrating transmit processing consistent with the transmitter of FIG. 3.

In contrast to FIG. 1, a data packet format 200 (proposed as an "alternative" PLCP frame format to accommodate transmit diversity according to the present invention) according to an embodiment of the invention will now be detailed with respect to FIGS. 2, 3 and the flowchart of FIG. 6. Turning first to FIG. 2, the novel packet format 200 begins with a standards compliant PLCP preamble 110. The PLCP preamble 110 in this embodiment is used for the same receiver training purposes as described above with reference to FIG. 1. The Signal field 215, which immediately follows the standards compliant PLCP preamble 110, is generally similar to the Signal field 115 described above. However, the Signal field 215 also includes a binary semaphore or flag TXDIV 217, which occupies the currently Reserved bit of the standards compliant Signal field 115. A TXDIV=TRUE setting indicates that the data packet follows the diversity data packet format 200. The advantage of using the Reserved bit ensures that legacy standards compliant transceivers encountering or intercepting a data packet formatted in accordance with the format 200 will correctly train to the PLCP preamble 110 and perceive the Signal field 215, but ignore it if the TXDIV flag 217 is set, because these legacy devices will perceive such packet as being erroneous and, consistent with existing IEEE 802.11a & 802.11g standards, will not attempt further decoding or recovery operations. At the same time, a TX diversity receiver, such as receiver 400 discussed below, will include appropriate logic to watch for and correctly interpret the TXDIV semaphore 217.

As discussed above, the data packet format 200 of the present embodiment as well as the transmitter 300 and receiver 400 described below attempt to accommodate legacy devices compliant with the IEEE 802.11a & 802.11g standards. To that end, as noted in FIG. 6, a preliminary determination is made whether a transmitter incorporating transmit diversity consistent with the present invention ("TX diversity transmitter"), such as transmitter 300 shown in FIG. 3, should transmit a frame/packet using the data packet format 200 (Step 610). This may be accomplished through appropriate application of user pre-selection, negotiation or handshaking techniques as is well known in the art. Alternatively, a default action would be to assume that the intended receiver is arranged in accordance with transmit diversity techniques consistent with the present invention, and if no acknowledgement is received of the packet transmitted in accordance with FIG. 2, the data will be retransmitted in accordance with the known format 100, and further transmission attempts will remain standards compliant using a single transmission unit such as the first transmission unit 350 of the transmitter 300, unless overridden in the future through e.g. specific device request or user selection.

It should be noted that in accordance with the packet format 200 shown in FIG. 2, both the PLCP preamble and the Signal field 215 are contemplated for transmission on the first of two transmission units of a TX diversity transmitter, such as the first one 350 of the transmission units 350 and 360 of the transmitter 300 shown in FIG. 3, again for backwards compatibility reasons. In the packet format 200 shown in FIG. 2, the notation "TX 1" in a given field or portion of the data packet 200 means that this portion will be transmitted on a first transmission unit of a TX diversity transmitter, such as transmission unit 350 shown in FIG. 3, whereas the notation "TX2" means that so-labeled portions will be transmitted by a second transmission unit of such TX diversity transmitter, such as transmission unit 360.

Immediately following the Signal field 215 in the packet format 200 is a second training preamble 218. It should be noted that the second preamble 218 has no analogue in the standards compliant format 100. This second preamble 218 is contemplated for transmission by a second transmission unit of a TX diversity transmitter (e.g. second transmission unit 360 of the transmitter 300 shown in FIG. 3). The purpose of this second preamble 200 is to permit a TX diversity receiver (e.g. receiver 400, FIG. 4) to re-estimate the potentially different signal characteristics between the second transmission unit and the receiver (step 625, FIG. 6) relative to the first transmission unit.

In the present embodiment, though not required, the second preamble 218 includes two long training symbols in sequence. In particular, the first long training symbol is contemplated to be used by a TX diversity receiver for coarse AGC adjustment to quickly attenuate the received signal broadcast by the second transmission unit of an originating TX diversity transmitter in case there may be strong difference in experienced gain between it and that previously encountered when receiving from the first transmission unit of such transmitter. The second long training symbol of the second preamble 218 is used to help this receiver estimate the channel transfer function from the second transmission unit to the receiving antenna.

Referring to FIG. 2, immediately following the second preamble is the data field 250 of the data packet 200 of the present embodiment. It should be noted that OFDM encoded symbols presented in the data field are modulated at the rate specified in the Signal field 215 in a manner similar to that specified for the standards compliant Signal field 115. As shown in FIG. 2 and as referenced in step 630 of FIG. 6, the Service field/DATA$_1$ 120 and its space-frequency analogue DATA$_1$N 220 are transmitted twice in succession by both the first and second transmission units of the TX diversity transmitter in parallel. In this embodiment, the data symbol pair DATA$_1$ 120 and DATA$_1$' 220 are transmitted at approximately the same time. The first transmitted pair is used by a TX diversity receiver such as receiver 400 to further refine automatic gain control after the coarse adjustment with reference to the first long training symbol of the second preamble 218 has been performed. The second or retransmitted pair of the Service field 120 and its space-frequency analogue DATA$_1$N 220 is actually demodulated according to the space-frequency decoding technique noted below and its contents recovered by this receiver.

The actual payload or PSDU portion 255 of the data packet format 200 will now be discussed with reference to FIGS. 2, 3 and 6. Similar to the known PLCP frame 100, the present PLCP frame 200 includes the payload transmitted in modulated, OFDM symbol encoded form. It should be noted that OFDM symbols DATA$_2$ 125, DATA$_3$ 130 ... DATA$_N$ 140, as well as the Service field/DATA$_1$ 120, are transmitted by a first transmission unit of a TX diversity transmitter unmodified from their presentation in accordance with known format 100. However, unlike PLCP frame format 100, the data packet format 200 also envisions at least substantially parallel transmission of modified DATA$_2$N 225, DATA$_3$N 230 ... DATA$_N$N 240, as well as the modified Service field or DATA$_1$N 220 at approximately the same time as their unmodified counterpart symbols by the second transmission unit of a this TX diversity transmitter. Thus, generally, in the payload 255 of the data packet format 200, each data symbol pair consisting of an OFDM encoded symbol (e.g. a given OFDM symbol DATA$_K$) and its corresponding space frequency modified symbol (e.g. DATA$_K$') is transmitted at approximately the same time over the first and second transmission units of a TX diversity transmitter.

According to FIG. 2, assuming the given OFDM symbol DATA$_K$ is to be transmitted in the Data field 250 of a packet conforming to packet format 200 by the transmitter 300, the first transmission unit 350 would transmit DATA$_K$ unmodified. The modified form of the symbol, DATA$_K$N will be transmitted over the second transmission unit 360 approximately the same time if not concurrently. Herein, DATA$_K$N differs from DATA$_K$ in that the 52 frequency domain subcarrier constellation points forming the OFDM encoded symbol DATA$_K$ are presented in complex conjugate form and are resequenced in pairs. Finally, the magnitude of the first subcarrier constellation point of each pair is multiplied by −1. For example, if DATA$_K$ comprises the following sequence of subcarrier symbols:

| subcarrier | 1 | 2 | 3 | 4 | ...52 |
|---|---|---|---|---|---|
| subsymbol of DATA$_K$ | A | B | C | D | ...AZ |

The subsymbols of DATA$_K$N would be transformed as follows:

| subcarrier | 1 | 2 | 3 | 4 | ...52 |
|---|---|---|---|---|---|
| constellation point of DATA$_K$N | −B* | A* | −D* | C* | ...AY* |

As shown in FIG. 3, a space frequency encoder 315 such as that detailed in the aforementioned Alamouti_reference is used to accomplish this transformation. This transformation is believed necessary in order for a TX diversity receiver to receive and recover both symbols DATA$_K$ and DATA$_K$N presented simultaneously on a common channel/carrier frequency, since in many instances both DATA$_K$ and DATA$_K$N will be perceived as part of a composite signal. As shown in Alamouti, transmission of the same data points A, B, ..., AZ according to the this space-frequency code can achieve a second order diversity gain with one receive antenna. Thus, the reliability of the transmission is increased.

It should be noted that a corresponding space frequency decoder provided within the receiver 400 in order to recover the OFDM encoded symbol DATA$_K$ from a possible composite signal combining DATA$_K$ and DATA$_K$N. In accordance with the data packet format 200 shown in FIG. 2, the space frequency encoding and parallel transmission of DATA$_K$ and DATA$_K$N continues until the end of the Data field 250 has been reached. See e.g., step 637, step 645 through 655 shown in FIG. 6 (note that step 655 and 660 are executed in a substantially parallel manner).

The data packet format 200 according to the present embodiment of the invention terminates with the tail and pad field discussed above.

Figure 5:
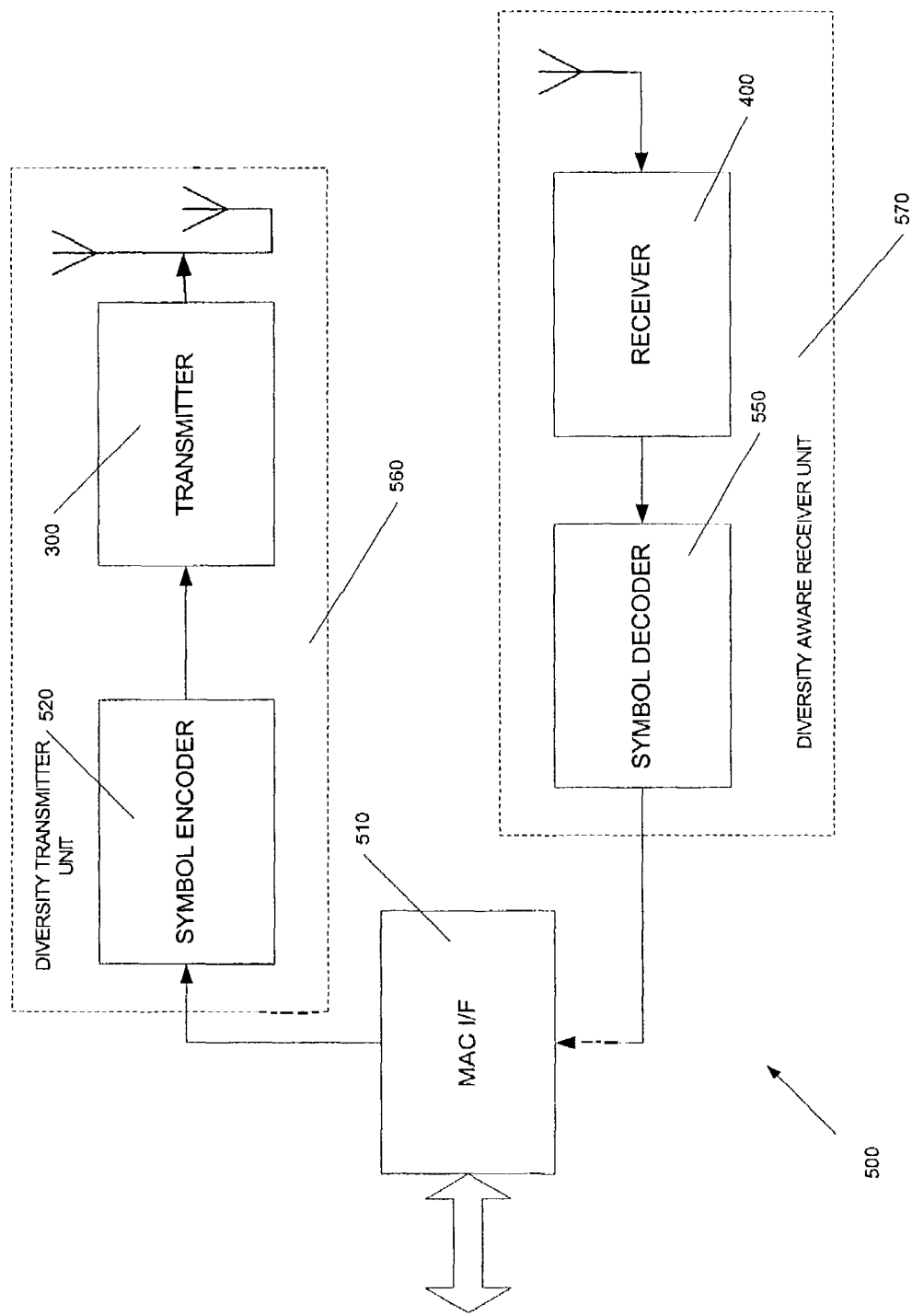
FIG. 5 is a block diagram of a wireless transceiver incorporating the transmitter and receiver described in FIG. 3 and FIG. 4 respectively.

Turning now to FIG. 3, it should be noted that the transmitter 300 receives baseband OFDM symbols for RF transmission from the symbol encoder 520 shown in FIG. 5. These OFDM symbols are encoded in the frequency domain as well known in the art in order to present extremely high speed time domain data in a less high speed manner by spreading the data over multiple subcarriers. Each OFDM symbol is presented serially by the symbol encoder 520, is converted into parallel form so that the entire OFDM symbol can be ascertained and space frequency encoded by the space-frequency encoder 315. It should be noted that the space frequency encoder 315 in this embodiment only encodes OFDM signals intended for transmission by the second transmission unit 360 when the second transmission unit 360 operates in parallel with the first transmission unit 350. However it will be appreciated by those of ordinary skill that the space frequency encoder 315 can be used in other encoding schemes and employ other symbol modification formats, as long as the behavior of the possible combinations of $x_2(n)$ and $x_1(n)$ within h(n) can be accounted for so that the underlying symbol encoded data can be adequately recovered.

It should be noted in the transmitter 300 of FIG. 3 that both the first and second transmission units 350, 360 include conversion units 320 and 335 respectively to transform the OFDM encoded symbols and corresponding modified symbols into the time domain using inverse discrete Fourier transform techniques. Then, within the conversion units 320 and 335, these time domain counterparts are serialized for cyclic prefix insertion compliant with the IEEE 802.11a and 802.11g standards, as well as other routine overhead preparation and formatting consistent with such standards. The so-converted time domain counterparts are then sent to the RF transmitter 325, 340 for IF and RF upconversion and amplified for transmission over antennas 330, 345 as signals $x_1(n)$ and $x_2(n)$ respectively.

A transmitter logic unit 318 is also shown in FIG. 3 communicatively coupled to the RF transmitters 325 and 340 as well as the space-frequency encoder 315 in order to carry out the transmit processing outlined above with reference to FIG. 6, including transmission of one or more outbound data packets formatted in accordance with format 200, as well as legacy format 100. To this end, the transmitter logic unit 318 includes logic to selectively enable at least the RF transmitters 325, 340 of the first and second transmission units 350, 360, as well as direct the space-frequency encoder 315 to space-frequency encode outbound OFDM symbols for transmission by the second transmission unit 360 consistent with the packet format 200. Moreover, the transmitter logic unit 318 will include logic to determine whether the transmitter 300 should operate in transmit diversity or legacy operating modes through recognition of an externally generated and managed TX_DIVERSITY SEMAPHORE indicating whether TX diversity transmission in accordance with packet format 200 should be employed. It should be noted that the transmit logic unit 318 may include any combination of dedicated logic and or circuits, including one or more finite state machines, as well as programmable logic such as ASICs, information processors such as a general purpose microprocessor or a specific purpose processor (e.g. a DSP) may be used to carry out the processing described above, such as that shown in FIG. 6.

While the embodiment of FIG. 3 contemplates dual conversion units 320, 335 to separately generate the time domain counterparts to the OFDM symbols and corresponding modified symbols, the teachings of the present invention are not intended to be so limited and in fact other arrangements including a single conversion unit may be provided as long as parallel (but not necessarily concurrent) transmission of the time domain counterpart signals can be performed.

Figure 7:
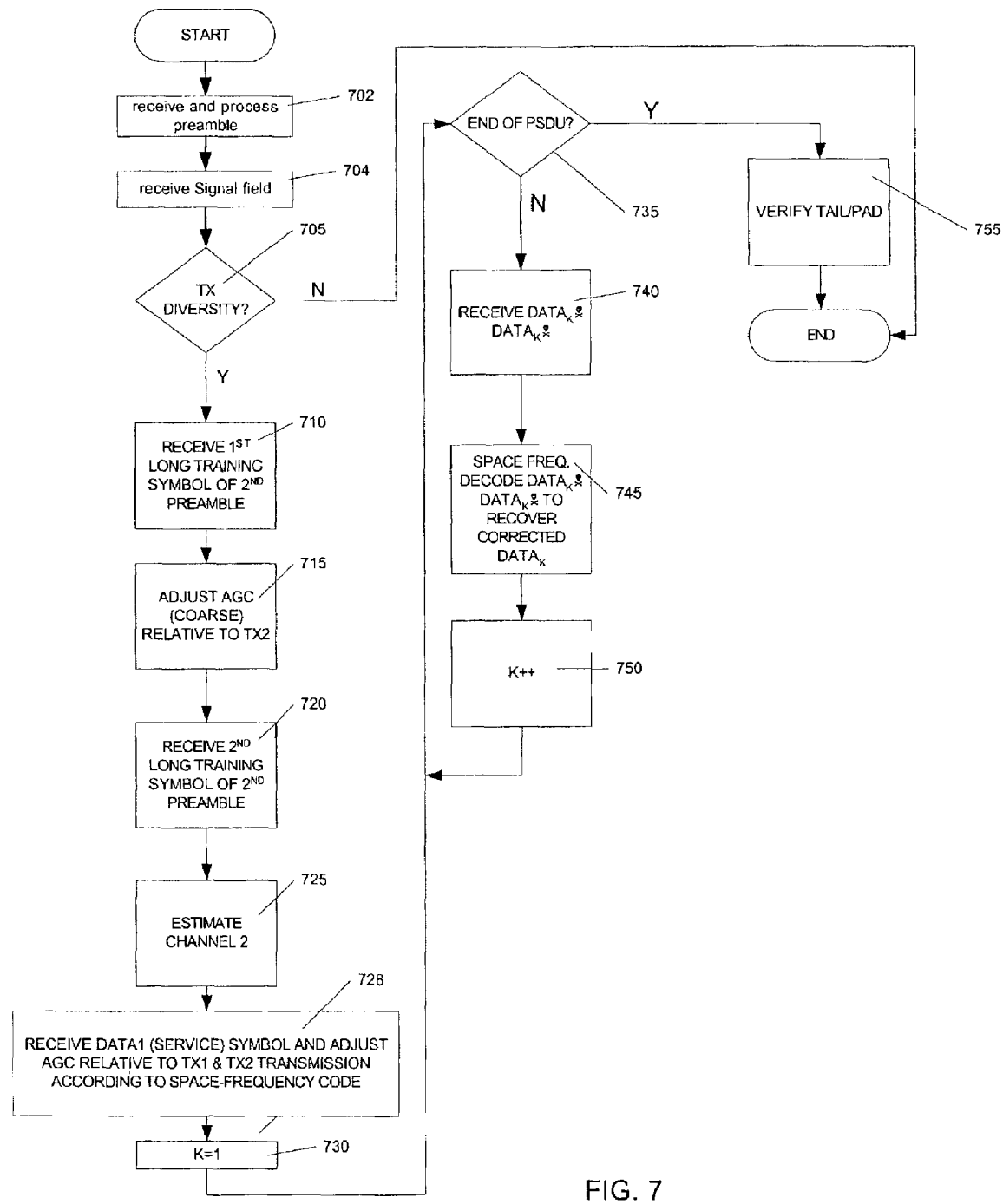
FIG. 7 is a flowchart illustrating receive processing consistent with the receiver of FIG. 4.

Transmit diversity receive processing and a receiver 400 according to an embodiment of the invention will now be discussed in more detail with reference to FIGS. 4 and 7 respectively. The transmit diversity compliant receiver 400 includes antenna 435 to receive, and, if necessary, attenuate a received signal h(n) based on an incident transmitted signal $x_1(n)$ and/or $x_2(n)$ transmitted by a TX diversity transmitter such as transmitter 300. The receiver 400 includes an RF receiver 410 to attenuate and downconvert the received signal. The channel estimator 430 estimates the frequency domain transfer function from the transmitter to the receiver for each subcarrier in the OFDM symbol consistent with the IEEE 802.11a & 802.11g standards. These transfer function estimates are then subsequently used by the conversion unit 415 for coherent data detection. The conversion unit 415 performs the opposite of conversion units 320 and 335 shown in FIG. 3 by verifying and removing cyclic prefix, converting the received signal into parallel form and performing a discrete Fourier transformation in order to recover a frequency domain composite signal 417. This signal 417 presents a data packet formatted in accordance with format 200 or the PLCP frame format 100 depending on the operational mode of the receiver 400.

Figure 4:
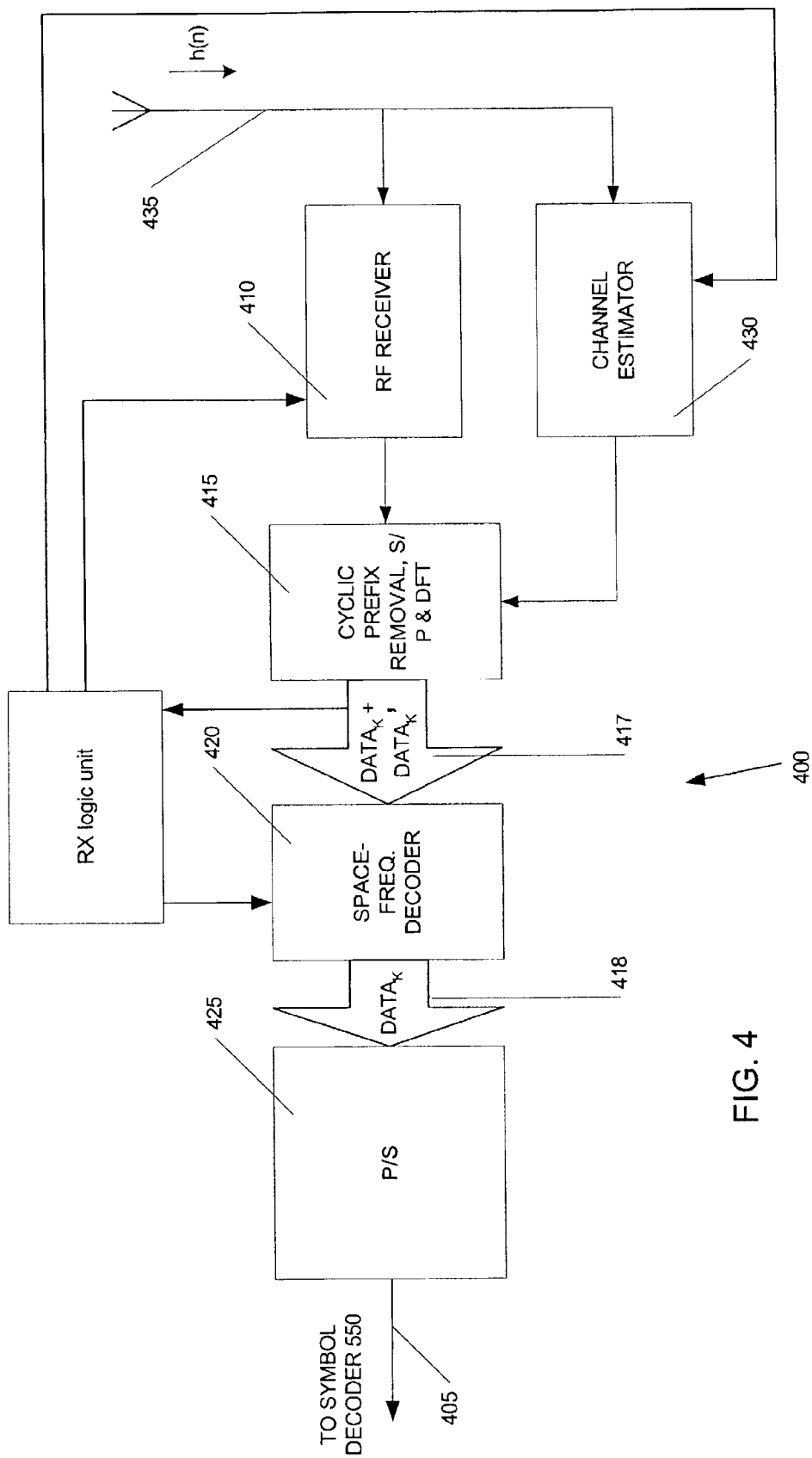
FIG. 4 is a simplified block diagram of a receiver capable of receiving a data packet formatted in accordance with FIG. 2.

As shown in FIG. 4, a receiver logic unit 422 is communicatively coupled to the output of the conversion unit 415 to monitor the frequency domain composite signal 417 to recognize and even decode certain portions of a data packet or PLCP frame, such as the PLCP preamble 110 and the Signal field 115 or 215. Referring to FIG. 7, when the receiver logic unit 422 perceives the "first" preamble 110 within the frequency domain composite signal 417, it undertakes conventional training procedures utilizing the RF receiver 410 and the channel estimator 430 as described above (step 702). The receiver 400 next receives the Signal field 115 shown in FIG. 1 or 215 shown in FIG. 2. The receive logic unit 422 perceives and decodes the Signal field, and if it fails to detect the TXDIV 217 flag being set in the Signal field (step 705), the receiver logic unit 422 assumes that a standards compliant PLCP frame according to frame format 100 is being received and conventional reception and processing techniques consistent with the IEEE 802.11a & 802.11g standards will be employed. In such case, the receiver logic unit 422 directs the space-frequency decoder 420 to operate as a pass-through buffer and present the recovered OFDM symbols generated by the conversion unit 415 to the parallel too serial converter 425 with no further modification or decoding.

If, however, the TXDIV flag 705 is perceived as set by the receiver logic unit 422, it assumes the inbound data packet presented by the frequency domain composite signal 417 emanates from a TX diversity transmitter and assumes the inbound data packet is formatted in accordance with format 200 (FIG. 2), and begins second transmission unit retraining (steps 710-728 of FIG. 7) and recovery of the Service field 120 using space-frequency encoding. Once retraining and Service field recovery are complete, the receiver logic unit begins recovery of the PSDU/payload 255 portion (steps 730 through 750) of the data packet. As noted above, within a given timeslice needed to convey the given OFDM symbol $DATA_K$, the recovered composite signal 417 may incorporate a complete or incomplete weighted analog sum of both $DATA_K$ and $DATA_K$N OFDM symbols. Therefore, in transmit diversity mode, this composite signal 417 is then fed to a space frequency decoder 420 for recovery of the "corrected" OFDM symbol of interest (here $DATA_K$).

The stream of recovered OFDM encoded symbols 418 generated by the space-frequency decoder are then sent to the parallel-serial unit 425 and then on to the symbol decoder 550 (FIG. 5) through interface 405.

It should be noted here that the receiver logic unit 422 may include a combination of dedicated logic and circuits configured as an event-driven state machine capable of carrying out the processing described above with reference to FIG. 7. Alternatively, the receiver logic 422 may incorporate one or more application specific circuits in combination with one or more specialized or general purpose information processors (e.g. such as a microprocessor, a microcontroller, a digital signal processor, consistent with the present invention) programmed in accordance with e.g. program code statements contained in memory accessible to such information processor(s).

FIG. 5 shows a transceiver 500 adapted for wireless data transmission consistent with the present invention as well as IEEE 802.11a & 802.11g standards, incorporating the transmitter 300 and receiver 400. The transmitter 300 is shown as part of a larger diversity transmitter unit 560 which also provides, through the symbol encoder 520, conventional OFDM encoding of outbound digital data presented by a network interface, such as the OSI layer 2+ MAC interface 510 shown in FIG. 5. Likewise, the receiver 400 forms part of a larger diversity aware receiver unit 570, which also performs conventional OFDM symbol decoding via decoder 550 in order for recovered inbound digital data to be presented to the data interface 510. Though not shown in FIG. 5, the transceiver 500 may form an operational part of a network interface apparatus such as a PC card or network interface card capable of interfacing with the CPU or information processor of an information processing apparatus such as a desktop or laptop computer, and may be integrated within and constitute a part of such information processing apparatus. This network interface apparatus may alternatively form an operational component of a wireless communications access point such as a base station as will be appreciated by these ordinarily skilled in the art.

It will be obvious to those having skill in the art that many changes may be made to the details of the above-described embodiments of this invention without departing from the underlying principles thereof. For example, though the transmit diversity techniques described above with reference to specific wireless data transmission implementations and embodiments interoperable with the IEEE 802.11a & 802.11g standards, the teachings of the present invention may easily encompass other types of wireless transmission, as will become apparent to those ordinarily skilled in the art. In addition, though the embodiments described above contemplate substantially concurrent or parallel transmission of the $DATA_K$ and modified counterpart $DATA_K'$ symbols, other sequencing of the $DATA_K$ and $DATA_K'$ symbols may be used, such as staggered sequencing of $DATA_K$ and $DATA_K'$ symbols in time, so long as a TX diversity aware receiver has the capability of discerning both symbols in accordance with the particular sequencing being utilized. The scope of the present invention should, therefore, be determined only by the following claims.

What is claimed is:

1. A diversity transmitter, comprising:
 a symbol encoder configured to encode data in a multicarrier frequency domain symbol (MFDS);
 a space frequency encoder responsive to said symbol encoder and configured to modify the MFDS in a first operational mode, the modified MFDS comprising a re-ordered subcarrier complex conjugate of the MFDS;
 a conversion unit responsive to said space frequency encoder and configured to convert the MFDS and the modified MFDS into first time domain counterparts respectively in the first operational mode and convert the MFDS into a second time domain counterpart corresponding thereto in a second operational mode;
 an RF transmission unit responsive to the conversion unit and configured to transmit the first time domain counterparts in the first operational mode and transmit the second time domain counterpart in the second operational mode; and
 a control logic configured to control operation of the diversity transmitter to one of the first and second operational modes, wherein the first operational mode is a diversity transmission mode and the second operational mode is a legacy transmission mode.

2. The transmitter of claim 1, wherein the MFDS comprises an orthogonal frequency division multiplexing (OFDM) encoded symbol.

3. The transmitter of claim 2, wherein the OFDM encoded symbol is encoded in compliance with at least one of IEEE Standard 802.11a and IEEE Standard 802.11g supplements to the IEEE Standard 802.11 (1999).

4. The transmitter of claim 1, wherein the RF transmission unit comprises:
   a first RF transmission unit comprising an RF upconverter to modulate the first time domain counterpart of the MFDS onto a first carrier signal in the first operational mode; and
   a second RF transmission unit comprising an RF upconverter to modulate the first time domain counterpart of the modified MFDS onto a second carrier signal in the first operational mode,
   wherein the first and second carrier signals operate in a common frequency channel.

5. The transmitter of claim 4, wherein the first time domain counterparts of the MFDS and the modified MFDS are transmitted by the first and second RF transmission units, respectively, at approximately the same time in the first operational mode.

6. The transmitter of claim 4, wherein the first time domain counterparts of the MFDS and the modified MFDS are transmitted by the first and second RF transmission units, respectively, in a staggered sequence in the first operational mode.

7. The transmitter of claim 1, wherein said conversion unit comprises:
   a first conversion unit configured to convert the MFDS into the first time domain counterpart corresponding thereto in the first operational mode; and
   a second conversion unit configured to convert the modified MFDS into the first time domain counterpart corresponding thereto in the first operational mode.

8. A diversity aware receiver, comprising:
   an RF receiver configured to receive a first time domain signal in a first operational mode and receive a second time domain signal in a second operational mode, the first time domain signal capable of defining a multicarrier frequency domain symbol (MFDS) and a modified MFDS, the modified MFDS comprising a re-ordered subcarrier complex conjugate of the MFDS, and the second timing domain signal capable of defining the MFDS;
   a conversion unit responsive to said RF receiver and configured to generate a first composite signal based on the first time domain signal in the first operational mode and generate a second composite signal based on the second time domain signal in the second operational mode, the first composite signal including at least an incomplete analog sum of the MFDS and the modified MFDS;
   a space frequency decoder responsive to said conversion unit and configured to decode the first composite signal in order to recover the MFDS from the first composite signal in the first operational mode, and decode the second composite signal in order to recover the second MFDS from the second composite signal in the second operational mode; and
   a control logic configured to control operation of the diversity aware receiver to one of the first and second operational modes, wherein the first operational mode is a diversity reception mode and the second operational mode is a legacy reception mode.

9. The receiver of claim 8, wherein the MFDS comprises an orthogonal frequency division multiplexing (OFDM) encoded symbol.

10. The receiver of claim 9, wherein the OFDM encoded symbol is encoded in compliance with at least one of IEEE Standard 802.11a and IEEE Standard 802.11g supplements to the IEEE Standard 802.11 (1999).

11. A diversity transceiver, comprising:
   a receiver; and
   a diversity transmitter, comprising:
      a symbol encoder to encode data in a first multicarrier frequency domain symbol (MFDS);
      a space frequency encoder responsive to said symbol encoder and configured to modify the first MFDS in a first operational mode, the modified first MFDS comprising a re-ordered subcarrier complex conjugate of the first MFDS;
      a conversion unit responsive to said space frequency encoder and configured to convert the first MFDS and the modified first MFDS into first time domain counterparts respectively corresponding thereto in the first operational mode, and convert the first MFDS into a second time domain counterpart corresponding thereto in a second operational mode;
      an RF transmission unit responsive to the conversion unit and configured to transmit the first time domain counterparts in the first operational mode and transmit the second time domain counterpart in the second operational mode; and
      a control logic configured to control operation of the diversity transmitter to one of the first and second operational modes, wherein the first operational mode is a diversity transmission/reception mode and the second operational mode is a legacy transmission/reception mode.

12. The transceiver of claim 11, wherein said receiver comprises:
   an RF receiver configured to receive a first time domain signal in the first operational mode and a second time domain signal in the second operational mode, the first time domain signal capable of defining a second MFDS and a modified second MFDS, and the second time domain signal capable of defining the second MFDS;
   a second conversion unit responsive to said RF receiver and configured to generate a first composite signal based on the first time domain signal in the first operational mode and generate a second composite signal based on the second time domain signal in the second operational mode, the first composite signal including at least an incomplete analog sum of the second MFDS and the modified second MFDS; and
   a space frequency decoder responsive to said second conversion unit and configured to recover the second MFDS from the first composite signal in the first operational mode and recover the second MFDS from the second composite signal in the second operational mode.

13. The transceiver of claim 12, wherein the modified second MFDS comprises a re-ordered subcarrier complex conjugate of the second MFDS.

14. The transceiver of claim 13, wherein the first MFDS and the second MFDS comprise an orthogonal frequency division multiplexing (OFDM) encoded symbol.

15. The transceiver of claim 14, wherein the OFDM encoded symbol is encoded in compliance with at least one of IEEE Standard 802.11a and IEEE Standard 802.11g supplements to the IEEE Standard 802.11 (1999).

16. The transceiver of claim 11, wherein the RF transmission unit comprises:
   a first RF transmission unit comprising an RF upconverter to modulate the first time domain counterpart of the first MFDS onto a first carrier signal in the first operational mode; and
   a second RF transmission unit comprising an RF upconverter to modulate the first time domain counterpart of the modified first MFDS onto a second carrier signal in the first operational mode, wherein the first and second carrier signals operate in a common frequency channel.

17. The transceiver of claim 11, wherein the first time domain counterparts of the first MFDS and the modified first MFDS are transmitted by the first and second RF transmission units, respectively, at approximately the same time in the first operational mode.

18. The transceiver of claim 11, wherein the first time domain counterparts of the first MFDS and the modified first MFDS are transmitted by the first and second RF transmission units, respectively, in a staggered sequence in the first operational mode.

19. The transceiver of claim 11, wherein said first conversion unit comprises:
   a third conversion unit configured to convert the first MFDS into the first time domain counterpart corresponding thereto in the first operational mode; and
   a fourth conversion unit configured to convert the modified first MFDS into the first time domain counterpart corresponding thereto in the first operational mode.

20. A network interface apparatus, comprising:
   a network interface capable of receiving outbound and inbound data;
   a diversity transceiver responsive to said network interface, comprising:
      a receiver; and
      a diversity transmitter, comprising:
         a symbol encoder to encode the outbound data in a first multicarrier frequency domain symbol (MFDS);
         a space frequency encoder responsive to said symbol encoder and configured to modify the first MFDS in the first operational mode, the modified first MFDS comprising a re-ordered subcarrier complex conjugate of the first MFDS;
         a first conversion unit responsive to said space frequency encoder and configured to convert the first MFDS and the modified first MFDS into first time domain counterparts respectively corresponding thereto in a first operational mode, and convert the first MFDS into a second time domain counterpart corresponding thereto in a second operational mode;
         an RF transmission unit configured to transmit the first time domain counterparts in the first operational mode and transmit the second time domain counterpart in the second operational mode;
         first and second antennae communicatively coupled to the RF transmission unit to broadcast the first time domain counterparts in the first operational mode and the second time domain counterpart in the second operational mode across a medium; and
         control logic configured to control operation of the diversity transmitter to one of the first and second operational modes, wherein the first operational mode is a diversity transmission/reception mode and the second operational mode is a legacy transmission/reception mode.

21. The apparatus of claim 20, wherein said receiver comprises:
   an RF receiver configured to receive a first time domain signal in the first operational mode and receive a second time domain signal in the second operational mode, the first time domain signal capable of defining a second MFDS and a modified second MFDS, the modified second MFDS comprising a re-ordered subcarrier complex conjugate of the second MFDS, and the second time domain signal capable of defining the second MFDS;
   a second conversion unit responsive to said RF receiver and configured to generate a first composite signal based on the first time domain signal in the first operational mode and generate a second composite signal based on the second time domain signal in the second operational mode, the first composite signal including at least an incomplete analog sum of the second MFDS and the modified second MFDS; and
   a space frequency decoder responsive to said conversion unit and configured to recover the second MFDS from the first composite signal in the first operational mode and to recover the second MFDS from the second composite signal in the second operational mode.

22. An information processing apparatus, comprising:
   an information processor; and
   a network interface apparatus responsive to said information processor, comprising:
      a network interface capable of receiving outbound and inbound data; and
      a diversity transceiver responsive to said network interface, comprising:
         a receiver; and
         a diversity transmitter, comprising:
            a symbol encoder to encode the outbound data in a first multicarrier frequency domain symbol (MFDS);
            a space frequency encoder responsive to said symbol encoder and configured to modify the first MFDS in a first operational mode, the modified first MFDS comprising a re-ordered subcarrier complex conjugate of the MFDS;
            a conversion unit responsive to said space frequency encoder and configured to convert the first MFDS and the modified first MFDS into first time domain counterparts respectively corresponding thereto in the first operational mode and convert the MFDS into a second time domain counterpart corresponding thereto in a second operational mode;
            an RF transmission unit configured to transmit the first time domain counterparts in the first operational mode, and transmit the second time domain counterpart in the second operational mode; and
            control logic configured to control operation of the diversity transmitter to one of the first and second operational modes, wherein the first operational mode is a diversity transmission/reception mode and the second operational mode is a legacy transmission/reception mode.

23. The apparatus of claim 22, wherein said receiver comprises:
   an RF receiver capable of receiving a first time domain signal in the first operational mode and a second time domain signal in the second operation mode, the first time domain signal capable of defining a second MFDS and a modified second MFDS, and the second time domain signal capable of defining the second MFDS;
   a second conversion unit responsive to said RF receiver and configured to generate a first composite signal based on the first time domain signal in the first operational mode and generate the second composite signal based on the second time domain signal in the second operational mode, the first composite signal including at least an incomplete analog sum of the second MFDS and the modified second MFDS; and a space frequency decoder responsive to said conversion unit and configured to recover the second MFDS from the first composite signal in the first operational mode and recover the second MFDS from the second composite signal in the second operational mode.

24. A diversity transmitter, comprising:

means for encoding data in a multicarrier frequency domain symbol (MFDS);

means for modifying the MFDS in a first operational mode, the modified MFDS comprising a re-ordered subcarrier complex conjugate of the MFDS;

means for converting the MFDS and the modified MFDS into first time domain counterparts respectively corresponding thereto in the first operational mode and converting the MFDS into a second time domain counterpart corresponding thereto in a second operational mode;

means for transmitting the first time domain counterparts in the first operational mode and transmitting the second time domain counterpart in the second operational mode; and means for controlling the diversity transmitter to operate in one of the first and second operational modes, wherein the first operational mode is a diversity transmission mode and the second operational mode is a legacy transmission mode.

25. The transmitter of claim 24, wherein the MFDS comprises an orthogonal frequency division multiplexing (OFDM) encoded symbol.

26. The transmitter of claim 25, wherein the OFDM encoded symbol is encoded in compliance with at least one of IEEE Standard 802.11a and IEEE Standard 802.11g supplements to the IEEE Standard 802.11 (1999).

27. The transmitter of claim 24, wherein said transmitting means comprises:

first means for modulating the first time domain counterpart of the MFDS onto a first carrier signal in the first operational mode, and second means for modulating the first time domain counterpart of the modified MFDS onto a second carrier signal in the first operational mode, wherein the first and second carrier signals operate in a common frequency channel.

28. The transmitter of claim 24, wherein the first time domain counterparts are transmitted by the transmitting means at approximately the same time in the first operational mode.

29. The transmitter of claim 24, wherein the first time domain counterparts are transmitted by the transmitting means in a staggered sequence in the first operational mode.

30. The transmitter of claim 24, wherein said converting means comprises:

first means for converting the MFDS into the first time domain counterpart thereof in the first operational mode; and second means for converting the modified MFDS into the first time domain counterpart thereof in the first operational mode.

31. A diversity aware receiver, comprising:

means for receiving a first time domain signal in a first operational mode and a second time domain signal in a second operational mode, the first time domain signal capable of defining a multicarrier frequency domain symbol (MFDS) and a modified MFDS, the modified MFDS comprising a re-ordered subcarrier complex conjugate of the MFDS, and the second time domain signal capable of defining the MFDS;

means for generating a first composite signal based on the first time domain signal in the first operational mode and generating a second composite signal based on the second time domain signal in the second operational mode, the first composite signal including at least an incomplete analog sum of the MFDS and the modified MFDS;

means for decoding the first composite signal in the first operational mode and decoding the second composite signal in the second operational mode in order to recover the MFDS therefrom; and means for controlling the diversity aware receiver to operate in one of the first and second operational modes, wherein the first operational mode is a diversity reception mode and the second operational mode is a legacy reception mode.

32. The receiver of claim 31, wherein the MFDS comprises an orthogonal frequency division multiplexing (OFDM) encoded symbol.

33. The receiver of claim 32, wherein the OFDM encoded symbol is encoded in compliance with at least one of IEEE Standard 802.11a and IEEE Standard 802.11g supplements to the IEEE Standard 802.11 (1999).

34. A diversity transceiver, comprising:

a receiver; and a diversity transmitter, comprising:

means for encoding data in a first multicarrier frequency domain symbol (MFDS);

means for modifying the first MFDS in a first operational mode, the modified first MFDS comprising a re-ordered subcarrier complex conjugate of the first MFDS;

means for converting the first MFDS and the modified first MFDS into first time domain counterparts respectively corresponding thereto in the first operational mode and converting the first MFDS into a second time domain counterpart corresponding thereto in a second operational mode;

means for transmitting the first time domain counterparts in the first operational mode and transmitting the second time domain counterpart in the second operational mode; and means for controlling the diversity transmitter to operate in one of the first and second operational mode, wherein the first operational mode is a diversity transmission/reception mode and the second operational mode is a legacy transmission/reception mode.

35. The transceiver of claim 34, wherein said receiver comprises:

means for receiving a first time domain signal in the first operational mode and receiving a second time domain signal in the second operational mode, the first time domain signal capable of defining a second MFDS and a modified second MFDS and the second time domain signal capable of defining the second MFDS;

means for generating a first composite signal based on the first time domain signal in the first operational mode and generating a second composite signal based on the second time domain signal in the second operational mode, the first composite signal including at least an incomplete analog sum of the second MFDS and the modified second MFDS; and means for recovering the MFDS from the first composite signal in the first operational mode and recovering the MFDS from the second composite signal in the second operational mode.

36. The transceiver of claim 35, wherein the modified second MFDS comprises a re-ordered subcarrier complex conjugate of the second MFDS.

37. The transceiver of claim 36, wherein the first MFDS and the second MFDS comprise an orthogonal frequency division multiplexing (OFDM) encoded symbol.

38. The transceiver of claim 37, wherein the OFDM encoded symbol is encoded in compliance with at least one of IEEE Standard 802.11a and IEEE Standard 802.11g supplements to the IEEE Standard 802.11 (1999).

39. The transceiver of claim 34, wherein said transmitting means comprises:
   first means for modulating the first time domain counterpart of the first MFDS onto a first carrier signal in the first operational mode; and
   second means for modulating the first time domain counterpart of the modified first MFDS onto a second carrier signal in the first operational mode,
   wherein the first and second carrier signals operate in a common frequency channel.

40. The transceiver of claim 34, wherein the first time domain counterparts are transmitted by said transmitting means at approximately the same time in the first operational mode.

41. The transceiver of claim 34, wherein the first time domain counterparts are transmitted by said transmitting means in a staggered sequence in the first operational mode.

42. The transceiver of claim 34, wherein said converting means comprises:
   first means for converting the first MFDS into the first time domain counterpart corresponding thereto in the first operational mode; and
   second means for converting the modified first MFDS into the first time domain counterpart corresponding thereto in the first operational mode.

43. A network interface apparatus, comprising:
   means for receiving outbound and inbound data; and
   a diversity transceiver, comprising:
      a receiver; and
      a diversity transmitter, comprising:
         means for encoding the outbound data in a first multicarrier frequency domain symbol (MFDS);
         means for modifying the first MFDS in the first operational mode, the modified first MFDS comprising a re-ordered subcarrier complex conjugate of the first MFDS;
         means for converting the first MFDS and the modified first MFDS into first time domain counterparts respectively corresponding thereto in the first operational mode and converting the first MFDS into a second time domain counterpart corresponding thereto in the second operational mode;
         means for transmitting the first time domain counterparts in the first operational mode and transmitting the second time domain counter part in the second operational mode;
         means for broadcasting the first time domain counterparts in the first operational mode and broadcasting the second time domain counterpart in the second operational mode across a medium; and
         means for controlling the diversity transmitter to operate in one of the first and second operational modes, wherein the first operational mode is a diversity transmission/reception mode and the second operational mode is a legacy transmission/reception mode.

44. The apparatus of claim 43, wherein said receiver comprises:
   means for receiving a first time domain signal in the first operational mode and receiving a second time domain signal in the second operational mode, the first time domain signal capable of defining a second MFDS and a modified second MFDS and the second time domain signal capable of defining the second MFDS;
   means for generating a first composite signal based on the first time domain signal in the first operational mode and generating a second composite signal based on the second time domain signal in the second operational mode, the first composite signal including at least an incomplete analog sum of the second MFDS and the modified second MFDS; and
   means for recovering the second MFDS from the first composite signal in the first operational mode and recovering the second MFDS from the second composite signal in the second operational mode.

45. An information processing apparatus, comprising:
   an information processor; and
   a network interface apparatus responsive to said information processor, comprising:
      means for receiving outbound and inbound data; and
      a diversity transceiver, comprising:
         a receiver; and
         a diversity transmitter, comprising:
            means for encoding the outbound data in a first multicarrier frequency domain symbol (MFDS);
            means for modifying the first MFDS in a first operational mode, the modified first MFDS comprising a re-ordered subcarrier complex conjugate of the first MFDS;
            means for converting the first MFDS and the modified first MFDS into first time domain counterparts respectively corresponding thereto in the first operational mode and converting the first MFDS to a second time domain counterpart corresponding thereto in a second operational mode;
            means for transmitting the first time domain counterparts in the first operational mode and transmitting the second time domain counterpart in the second operational mode;
            means for broadcasting the first time domain counterparts in the first operational mode and broadcasting the second time domain counter part in the second operational mode across a medium; and
            means for controlling the diversity transmitter to operate in one of the first and second operational modes, wherein the first operational mode is a diversity transmission/reception mode and the second operational mode is a legacy transmission/reception mode.

46. The apparatus of claim 45, wherein said receiver comprises:
   means for receiving a first time domain signal in the first operational mode and a second time domain signal in the second operational mode, the first time domain signal capable of defining a second MFDS and a modified second MFDS and the second time domain signal capable of defining the second MFDS;
   means for generating a first composite signal based on the first time domain signal in the first operational mode and generating a second composite signal based on the second time domain signal in the second operational mode, the first composite signal including at least an incomplete analog sum of the second MFDS and the second modified symbol; and means for recovering the MFDS from the first composite signal in the first operational mode and recovering the MFDS from the second composite signal in the second operational mode.

47. A diversity transmitter, comprising:

a symbol encoder configured to encode data in a multicarrier frequency domain symbol (MFDS);

a space frequency encoder responsive to said symbol encoder and configured to modify the MFDS in a first operational mode, the modified MFDS comprising a re-ordered subcarrier complex conjugate of the MFDS;

a conversion unit responsive to said space frequency encoder and configured to convert the MFDS and the modified MFDS into first time domain counterparts thereof, respectively, in the first operational mode and convert the MFDS into a second time domain counterpart corresponding thereto in a second operational mode;

an RF transmission unit responsive to the conversion unit and configured to transmit the first time domain counterparts in the first operational mode and transmit the second time domain counterpart in the second operational mode; and a control logic configured to control operation of the diversity transmitter to one of the first and second operational modes, wherein the first operational mode is a diversity transmission mode and the second operational mode is a legacy transmission mode, wherein the RF transmission unit comprises:

a first RF transmission unit comprising an RF upconverter to modulate the first time domain counterpart of the MFDS onto a first carrier signal in the first operational mode; and a second RF transmission unit comprising an RF upconverter to modulate the first time domain counterpart of the modified MFDS onto a second carrier signal in the first operational mode, wherein the first and second carrier signals operate in a common frequency channel, wherein the transmitter transmits the data in a first data packet format in the first operation mode and transmit the data in a second data packet format in the second operational mode, the first data packet format comprising:

a first portion comprising a transmission diversity semaphore;

a second portion adjacent to said first portion, said second portion comprising a preamble to enable training of a receiver receiving the data; and a third portion following said second portion, said third portion comprising a payload, the payload comprising a plurality of data symbol pairs, at least one of said data symbol pairs comprising the MFDS and the modified MFDS, wherein the first data packet format further comprises a fourth portion preceding the first portion, the fourth portion comprising a first preamble to enable training the receiver to the first RF transmission unit.

48. The diversity transmitter of claim 47, wherein said second portion comprises a second preamble to enable training of the receiver to the second RF transmission unit.

49. A transmit diversity communication method, comprising:

controlling operation to one of a first operational mode and a second operational mode;

encoding data in a multicarrier frequency domain symbol (MFDS);

modifying the MFDS when operating in the first operational mode, the modified MFDS comprising a re-ordered subcarrier complex conjugate of the MFDS;

converting the MFDS and the modified MFDS into first time domain counterparts respectively corresponding thereto when operating in the first operational mode;

converting the MFDS into a second time domain counterpart corresponding thereto when operating in the second operational mode;

transmitting the first time domain counterparts when operating in the first operational mode; and transmitting the second time domain counterpart when operating in the second operational mode, wherein the first operational mode is a diversity transmission mode and the second operational mode is a legacy transmission mode.

50. The method of claim 49, wherein the MFDS comprises an orthogonal frequency division multiplexing (OFDM) encoded symbol.

51. The method of claim 50, wherein the OFDM encoded symbol is encoded in compliance with at least one of IEEE Standard 802.11a and IEEE Standard 802.11g supplements to the IEEE Standard 802.11 (1999).

52. The method of claim 49, wherein said transmitting the first time domain counterparts comprises modulating the first time domain counterparts of the MFDS and the modified MFDS onto a first carrier signal and a second carrier signal, respectively, the first and second carrier signals operating in a common frequency channel.

53. The method of claim 49, wherein said transmitting the first time domain counterparts comprises transmitting the first time domain counterparts at approximately the same time.

54. The method of claim 49, wherein said transmitting the first time domain counterparts comprises transmitting the first time domain counterparts in a staggered sequence.

55. The method of claim 49, further comprising:

receiving a first time domain signal in the first operational mode and a second time domain signal in the second operational mode, the first time domain signal capable of defining a second MFDS and a modified second MFDS and the second time domain signal capable of defining the second MFDS;

generating a first composite signal based on the first time domain signal in the first operational mode, the first composite signal including at least an incomplete analog sum of the second MFDS and the modified second MFDS;

generating a second composite signal based on the second time domain signal in the second operational mode; and recovering the second MFDS from the first composite signal in the first operational mode; and recovering the second MFDS from the second composite signal in the second operational mode.

56. A computer readable medium having a computer program embodying instructions, which, when executed by a computer, cause the computer to transmit data, the computer readable medium comprising:

instructions for controlling operation to one of a first operational mode and a second operational mode;

instructions for encoding data in a multicarrier frequency domain symbol (MFDS);

instructions for modifying the MFDS when operating in the first operational mode, the modified MFDS comprising a re-ordered subcarrier complex conjugate of the MFDS;

instructions for converting the MFDS and the modified MFDS into first time domain counterparts respectively corresponding thereto when operating in the first operational mode;

instructions for converting the MFDS into a second time domain counterpart corresponding thereto when operating in the second operational mode;

instructions for transmitting the first time domain counterparts when operating in the first operational mode; and instructions for transmitting the second time domain counterpart when operating in the second operational mode, wherein the first operational mode is a diversity transmission/reception mode and the second operational mode is a legacy transmission/reception mode.

57. The computer readable medium of claim 56, wherein the MFDS comprises an orthogonal frequency division multiplexing (OFDM) encoded symbol.

58. The computer readable medium of claim 57, wherein the OFDM encoded symbol is encoded in compliance with at least one of IEEE Standard 802.11a and IEEE Standard 802.11g supplements to the IEEE Standard 802.11 (1999).

59. The computer readable medium of claim 56, wherein said instructions for transmitting the first time domain counterparts comprises instructions for modulating the first time domain counterparts of the MFDS and the modified MFDS onto a first carrier signal and a second carrier signal, respectively, the first and second carrier signals operating in a common frequency channel.

60. The computer readable medium of claim 56, wherein said instructions for transmitting the first time domain counterparts comprises instructions for transmitting the first time domain counterparts at approximately the same time in the first operational mode.

61. The computer readable medium of claim 56, wherein said instructions for transmitting the first time domain counterparts comprises instructions for transmitting the first time domain counterparts in a staggered sequence in the first operational mode.

62. The computer readable medium of claim 56, further comprising:

instructions for receiving a first time domain signal operational mode, the first time domain signal capable of defining a second MFDS and a modified second MFDS;

instructions for receiving a second time domain signal in the second operational mode, the second time domain signal capable of defining the second MFDS;

instructions for generating a first composite signal based on the first time domain signal in the first operational mode, the first composite signal including at least an incomplete analog sum of the second MFDS and the modified second MFDS;

instructions for generating a second composite signal based on the second time domain signal in the second operational mode;

instructions for recovering the second MFDS from the first composite signal in the first operational mode; and instructions for recovering the second MFDS from the second composite signal in the second operational mode.

* * * * *